United States Patent [19]

Matsumoto et al.

[11] Patent Number: 4,642,776
[45] Date of Patent: Feb. 10, 1987

[54] AUTOMOBILE ROUTE INFORMATION DISPLAY

[75] Inventors: Muneaki Matsumoto, Okazaki; Koji Numata, Toyokawa, both of Japan

[73] Assignee: Nippon Soken, Inc., Aichi, Japan

[21] Appl. No.: 627,622

[22] Filed: Jul. 3, 1984

[30] Foreign Application Priority Data

Jul. 12, 1983 [JP] Japan .................. 58-125532

[51] Int. Cl.⁴ ............................................. G06F 15/50
[52] U.S. Cl. ..................... 364/449; 364/444; 340/988
[58] Field of Search ............... 364/424, 444, 449, 460; 340/988, 995

[56] References Cited

U.S. PATENT DOCUMENTS

| | | | |
|---|---|---|---|
| 3,925,641 | 12/1975 | Kashio | 364/424 |
| 4,084,241 | 4/1978 | Tsumura | 364/460 |
| 4,435,760 | 3/1984 | Kuno et al. | 364/424 |
| 4,517,565 | 5/1985 | Nakamura et al. | 364/460 |
| 4,532,514 | 7/1985 | Hatano et al. | 364/424 |
| 4,535,334 | 8/1985 | Tagami et al. | 340/988 |
| 4,563,685 | 1/1986 | Matsumoto et al. | 340/995 |

Primary Examiner—Gary Chin
Attorney, Agent, or Firm—Cushman, Darby & Cushman

[57] ABSTRACT

A device for displaying information concerning the travel route of an automobile vehicle includes a calculation unit for continuously monitoring the changes in the travel direction of the vehicle on the basis of the direction detected by the direction detection unit, and successively storing change signals corresponding to the amount of change in the travel direction of the vehicle, when the amount of change in the vehicle direction exceeds a predetermined amount, and a distance signal corresponding to the change signal, on the outward travel route, and generating a travel direction signal approximately at a predetermined distance on the basis of the stored change signal and the stored distance signal, on the return travel route. The vehicle travel direction, the distance, and the direction toward the destination or the starting point, and the distance toward a vehicle travel direction change point are displayed on fluorescent indicator tubes.

4 Claims, 14 Drawing Figures

| Fig.7A | Fig. 7B | Fig.7C |

AUTOMOBILE ROUTE INFORMATION DISPLAY

BACKGROUND OF THE INVENTION

1. Field of the Invention

The present invention relates to a device for the display of information concerning a travel route of an automobile. The device according to the present invention is used for providing information concerning the present position of a moving vehicle and information concerning the direction of travel of a moving vehicle on the route from the starting point to the destination of travel and vice versa.

2. Description of the Prior Art

In general, information on the route of a vehicle travelling from the starting point to the destination of a journey is obtained by a driver through observation of road signs or by referring to a road map. However, it is difficult for the driver to conduct such observation continuously, and it is sometimes almost impossible for the driver to conduct such observation while driving the vehicle. Also, on the return route from the destination to the starting point, although the vehicle has already traveled along the route, the driver sometimes encounters difficulty in finding the correct route, because the landmarks observed by the driver between the starting point and the destination appear different from those observed between the destination and the starting point.

SUMMARY OF THE INVENTION

An object of the present invention is to provide an improved device for the display of information concerning the travel route of an automobile in which the distance for the detection of changes in direction of travel of the vehicle is changed in accordance with the vehicle running speed; wherein only travel direction changes at crossroads are detected and stored without storing moving direction changes due to lane changes or curves in a road, and, hence, an automatic display of the direction of travel of the vehicle on the return route from the destination to the starting point is carried out with a higher accuracy and reliability.

In accordance with the present invention, there is provided a device for displaying information concerning a travel route of an automobile vehicle including a direction detection unit for generating a direction signal corresponding to the vehicle travel direction, and a distance detection unit for generating a distance signal corresponding to the distance travelled by the vehicle. A calculation unit is provided for continuously monitoring changes in the travel direction of the vehicle, on the basis of the direction detected by the direction detection unit, and successively storing change signals corresponding to the amount of change in the direction of travel of the vehicle, when the amount of that change exceeds a predetermined amount, and a distance signal corresponding to the change signal, on the route from the starting point to the destination, and generating a travel direction signal at approximately a predetermined distance on the basis of the stored change signal and the stored distance signal, on the route from the destination to the starting point.

A display unit for displaying the travel direction on the route from the destination to the starting point on the basis of the signals received from the calculation unit, and an instruction unit for supplying the calculation unit with a mode signal corresponding to the outward travel state or the return travel state are also provided.

DESCRIPTION OF THE PREFERRED EMBODIMENTS

Figure 1:
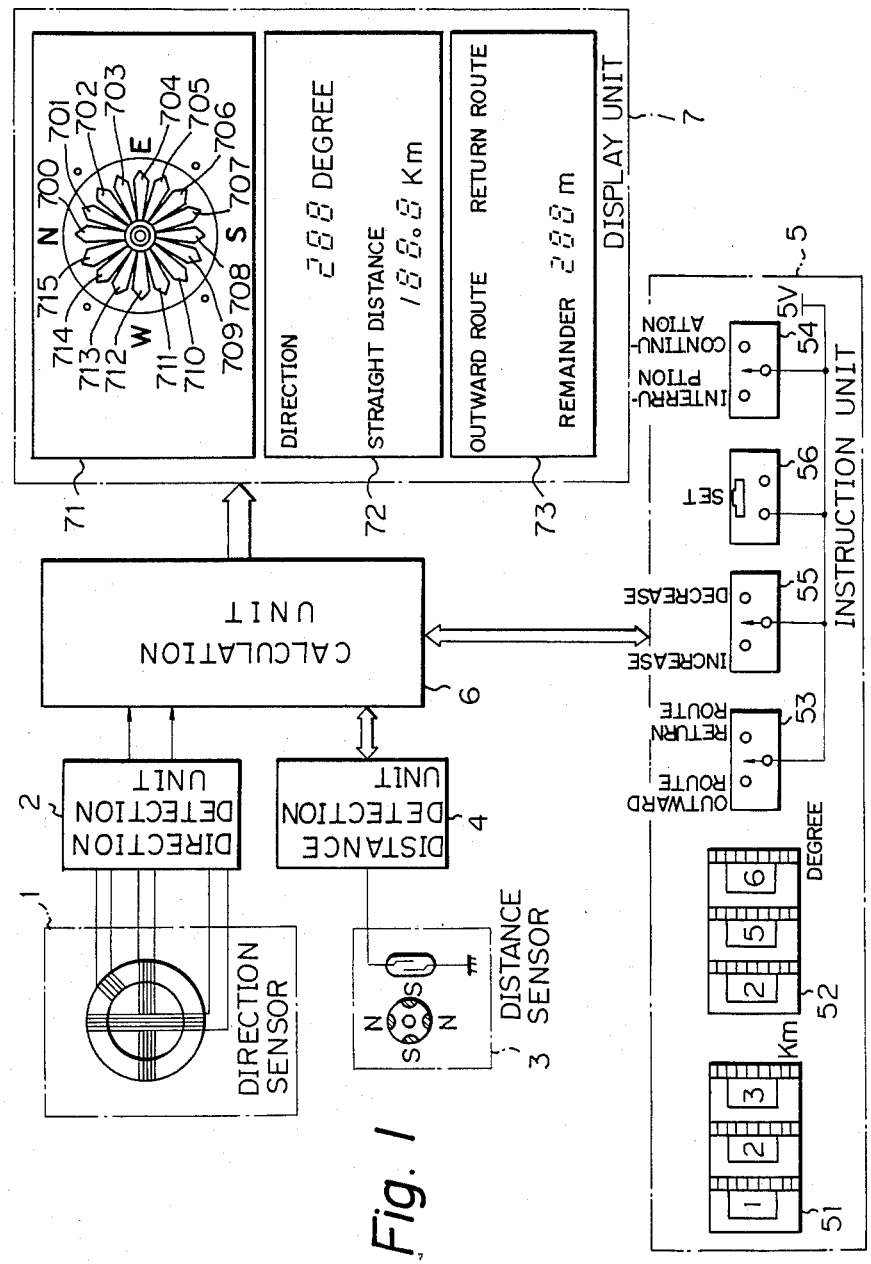
FIG. 1 is a schematic diagram of a device for the display of information concerning the travel route of an automobile according to an embodiment of the present invention.

A device for the display of information concerning the travel route of an automobile according to an embodiment of the present invention is shown in FIG. 1. A direction sensor 1 produces a signal corresponding to the direction of travel of an automobile, which signal has X and Y components of terrestrial magnetism. The X component represents an east-west direction with a positive polarity for the east direction, while the Y component represents a north-south direction with a positive polarity for the north direction. A direction detection unit 2 includes an analog-to-digital converter for converting an analog signal from the direction sensor having X and Y components of terrestrial magnetism and an oscillator for driving the direction sensor 1. The direction detection unit 2 produces a digital directional signal having X and Y components corresponding to the direction of travel of the vehicle. Note, in addition to the cardinal points of the compass (N, S, E, W) 16 other directions can be displayed, as shown in FIG. 1 by numerals 700 to 707 and 708 to 715.

Figure 2:
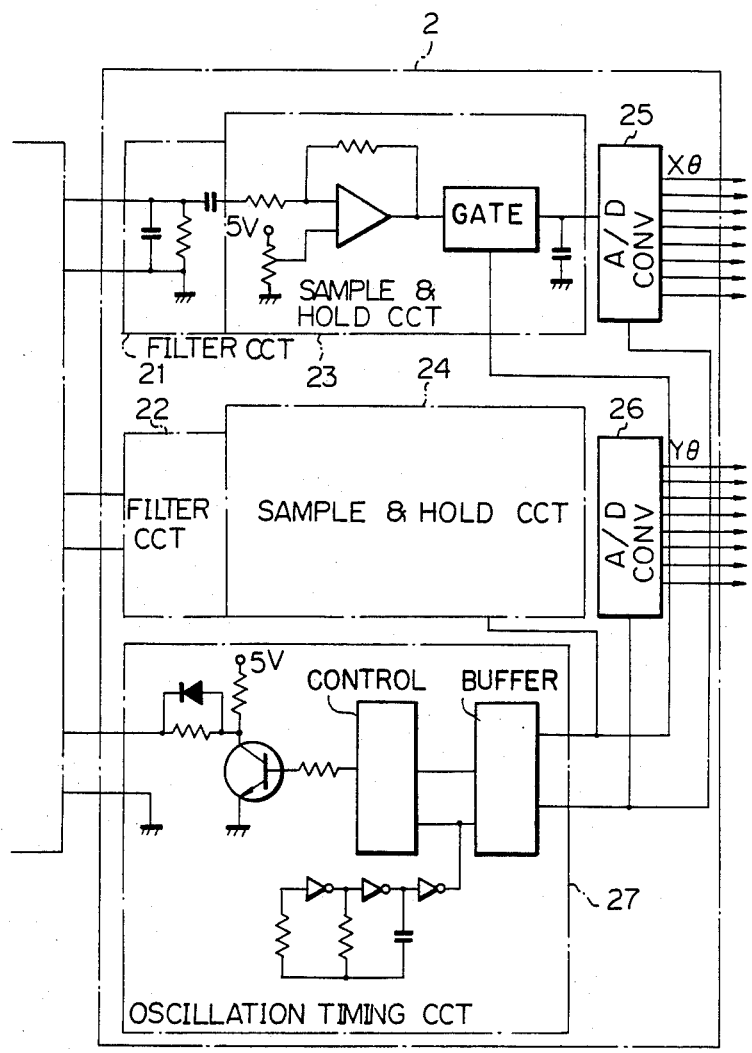
FIG. 2 illustrates the structure of the direction detection unit in the device shown in FIG. 1.

The structure of the direction detection unit is illustrated in FIG. 2. Filter circuits 21 and 22 receive the signal having the X and Y components of terrestrial magnetism from the direction sensor 1. Amplification sample and hold circuits 23 and 24 convert the signals from the filter circuits 21 and 22 into DC voltage. Analog-to-digital converters 25 and 26 convert the signals from the amplification sample and hold circuits 23 and 24 into digital directional signals $X\theta$ and $Y\theta$.

The digital directional signals $X\theta$ and $Y\theta$ are supplied to the three state buffers with latch circuits 670 and 671 of a calculation unit 6, the outputs of which are supplied to a bus line 62 in accordance with the read signals 68A and 68B. The oscillation timing circuit 27, including a known oscillation circuit and a frequency division circuit, produces a signal for exciting the direction sensor and a number of timing signals. Refer to Japanese Unexamined Patent Publication (Kokai) No. 57-29966 "Device for measurement of magnetic fields" for details of the structure of the direction detection unit.

Figure 3:
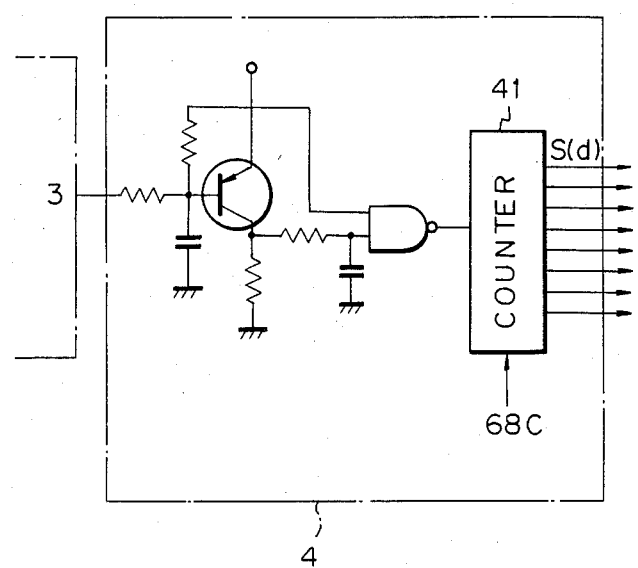
FIG. 3 illustrates the structure of the distance detection unit in the device shown in FIG. 1.

A distance detection unit 4 as shown in FIG. 3 includes a counter 41 for receiving the signal consisting of pulses generated every predetermined travel distance, e.g., 39.2 cm, from the distance sensor 3, and the control signal from the calculation unit 6, and producing a digital distance signal generated every unit of time.

The structure of the distance detection unit is illustrated in FIG. 3. The distance signal from the distance sensor 3 is waveform shaped and supplied to the counter 41, which produces a digital distance signal S(d). The counter 41 is reset at predetermined intervals, i.e., every occurrence of step S202, by a predetermined reset signal 68C.

The digital distance signal S(d) is supplied to a three state buffer circuit with latch 672, (shown in FIG. 5) which supplies the output to the bus line 62 in accordance with read signal 68D.

Figure 4:
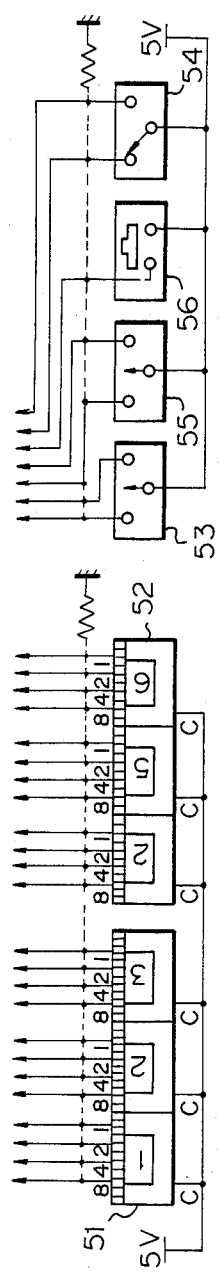
FIG. 4 illustrates the structure of the instruction unit in the device shown in FIG. 1.

An instruction unit 5 includes a distance set switch 51 for setting the distance toward the destination and producing the distance set signal, a direction set switch 52 for setting the direction toward the destination, an outward/return route changeover switch 53 for setting an outward/return route and producing an outward-/return indication signal, an interruption switch 54 for producing an interruption signal corresponding to one-way traffic conditions or the like, a neutral return type distance increase/decrease switch 55 for producing a distance increase/decrease signal used for distance correction concerning the difference between the outward and return routes, and a normally open type set switch 56 for producing a set signal indicating the starting point. The structure of the instruction unit 5 is illustrated in FIG. 4.

Figure 5:
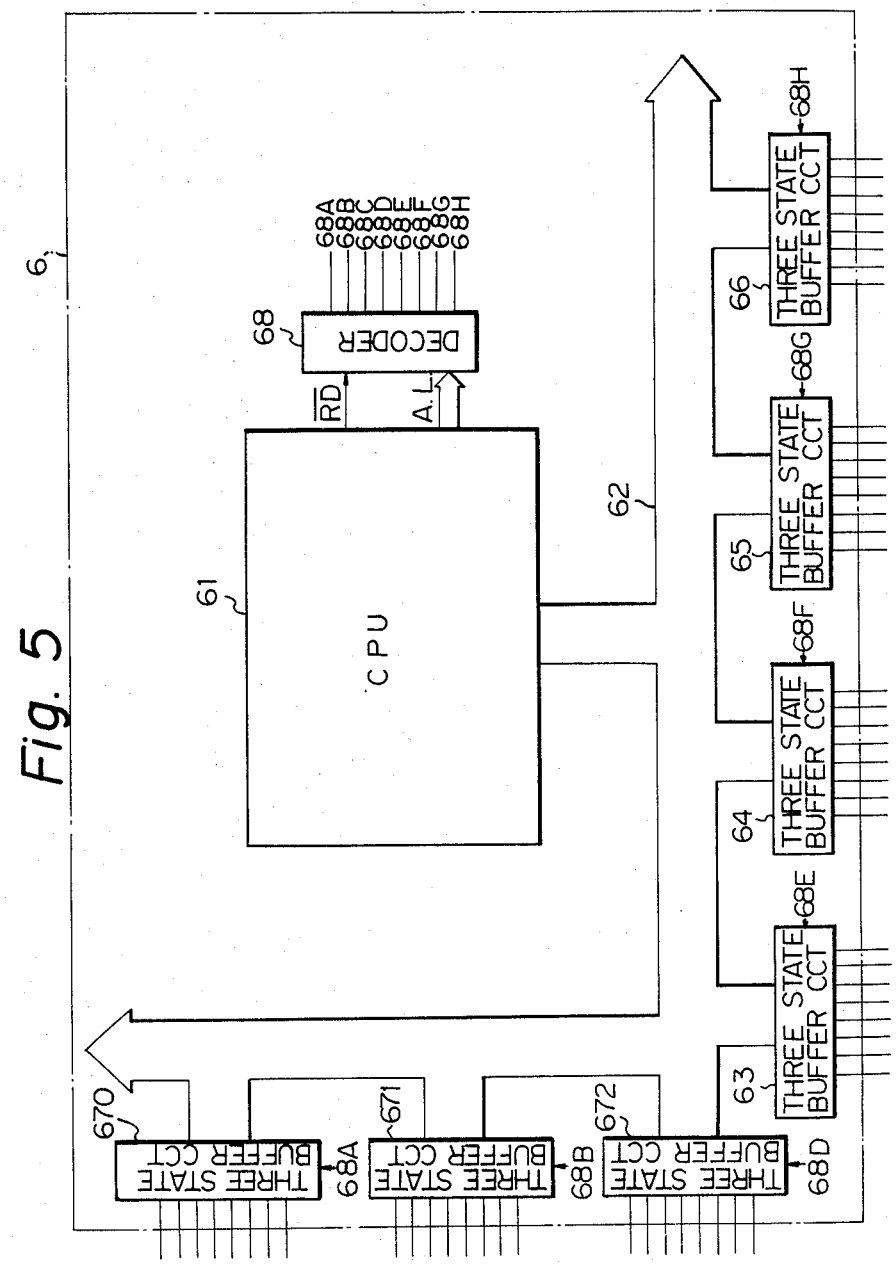
FIG. 5 illustrates the structure of the calculation unit in the device shown in FIG. 1.

A microcomputer type calculation unit can be used for the calculation unit 6 as shown in FIG. 5. The calculation unit 6 includes a central processor unit 61, a read only memory, a random access memory, input/output circuits, and a clock signal generator. The calculation unit 6 is supplied with a stabilized 5 V power from a power source through a stabilization circuit. A decoder 68 generates predetermined read signals in accordance with an address line (A.L.) signal and an inverted RD ($\overline{RD}$) signal from the central processor unit 61.

The random access memory (not shown in FIG. 5) in the calculation unit 6 is supplied constantly with power from a battery provided in the automobile to ensure that the stored content remains nonvolatile while the automobile is not in operation, i.e., while the ignition switch is in an OFF mode.

The output terminals of the switches 51 to 56 are connected to the input terminals of the three state buffer circuits 63 to 66. The three state buffer circuits 63 to 66 transmit the information concerning the state of the switches 51 to 56 to the bus line 62 in accordance with the read signal from the decoder 68. The central processor unit 61 reads the information concerning the state of the switches 51 to 56 and carries out a predetermined operation. The decoder 68 generates predetermined read signals 68A to 68H based on the address line (A.L.) signal and the inverted RD ($\overline{RD}$) signal from the central processor unit 61.

A display unit 7 includes fluorescent indicator tubes 71, 72, and 73, and a warning buzzer (not shown). The fluorescent indicator tube 71 is used for displaying the direction of travel of the vehicle on the outward route from the starting point to the destination, and the direction of travel of the vehicle on the return route from the destination to the starting point. The fluorescent indicator tube 72 is used for displaying the distance and direction toward the destination while the vehicle is travelling along the outward route from the starting point to the destination, and the distance and direction toward the starting point while the vehicle is travelling along the return route from the destination to the starting point. The fluorescent indicator tube 73 is used for displaying the travelling state while the vehicle is travelling along the outward route from the starting point to the destination, the travelling state while the vehicle is travelling along the return route from the destination to the starting point, and the distance to a vehicle travel direction change point. The buzzer sounds to warn the vehicle driver of the approach of the point at which the direction of travel should be changed.

Figure 6:
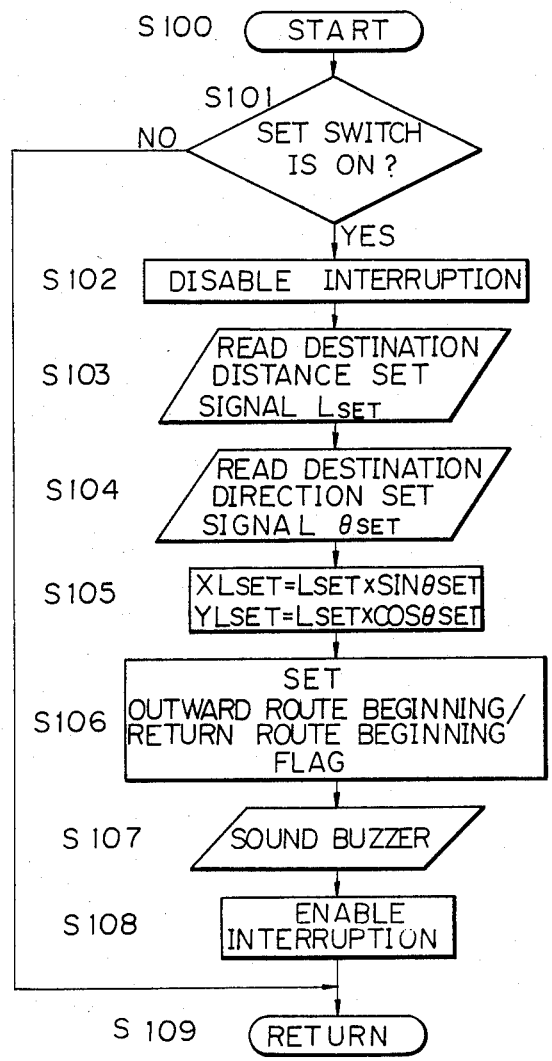
FIGS. 6 to 10 are flow charts of the operation of the calculation unit in the device shown in FIG. 1.

The operation of the calculation unit 6 will now be described with reference to the flow charts shown in FIGS. 6 to 10. When the ignition switch provided in the motor vehicle in question is turned ON, the calculation unit 6 is made active by receiving the stabilized 5 V power through the stabilization circuit from the battery, so that the initialization of the registers, counters, and latches in the calculation unit 6 is carried out. The calculation of the main routine shown in the flow chart in FIG. 6 is then carried out repeatedly at a predetermined period.

Figures 7, 7A:
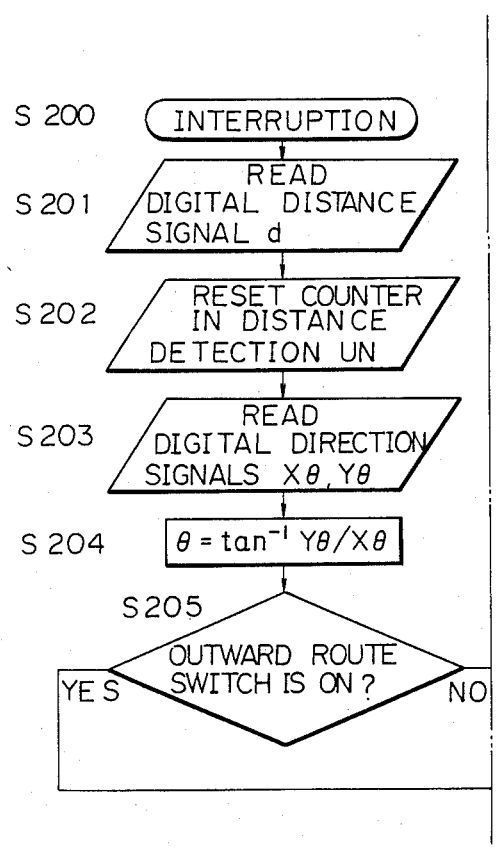
Figure 7B:
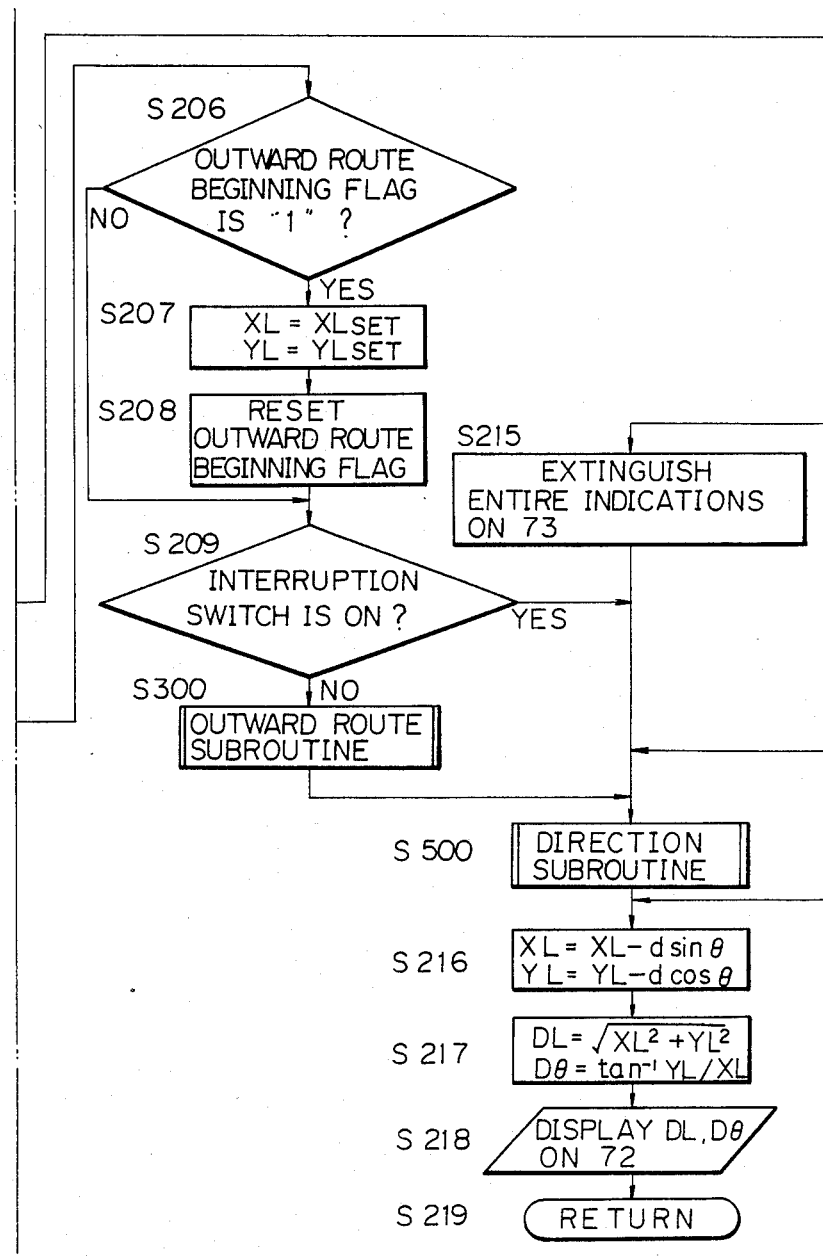
Figure 7C:
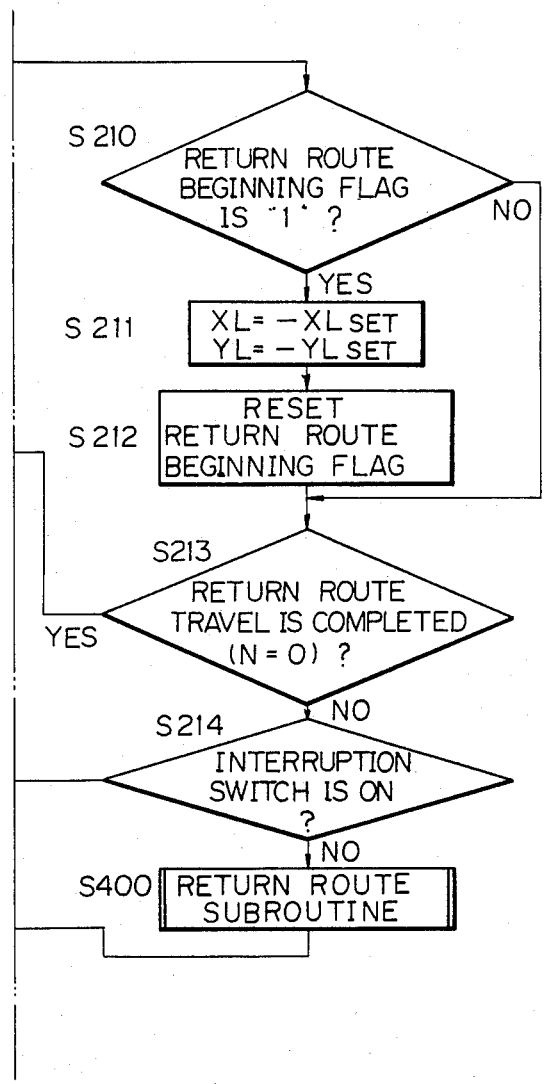

In step S101, the decision is made as to whether or not the set switch 56 is ON. When the decision is NO, the decision at step S101 is carried out repeatedly. When the set switch 56 is turned ON after the distance and direction toward the destination have been set by the distance set switch 51, the set signal is generated to make the decision at step S101 YES and, hence, the process proceeds to step S102 so that the calculation of the interruption routine shown in the flow chart in FIG. 7 is disabled. The destination distance set signal LSET is read in step S103, and the destination direction set signal $\theta$SET is read in step S104. In step S105, X component XLSET and Y component YLSET of the destination distance set signal are calculated and stored.

The forward route flag and the return route flag are set in step S106 as the result of the completion of the setting. In step S107, the buzzer is sounded to indicate the completion of the setting. The disablement of the interruption routine shown in the flow chart of FIG. 7 is released in step S108. The above-described calculation of the main routine is then carried out repeatedly.

Each time an interruption signal is supplied to the interruption input terminal of the calculation unit 6, at an interval of 0.25 sec, the calculation of the above-described main routine is temporarily stopped and the interruption calculation process of the flow chart shown in FIG. 7 is carried out.

The calculation is started in step S200, and the data of distance per unit of time is read in step S201. A reset signal for resetting the counter in the distance detection unit 4 is produced in step S202.

The digital distance signals $X\theta$ and $Y\theta$ from the direction detection unit 2 are read in step S203, and, in step S204, the travel direction $\theta$ is calculated and stored as $\tan^{-1} Y\theta/X\theta$. In step S205, the state of the outward-/return changeover switch 53 is decided. When the state is decided as outward travel, the process proceeds to step S206.

The state of initial flag of the outward route is decided in step S206. In step S206, when the state is decided to be flag "1" i.e., the first passing, the process proceeds to step S207. In step S207, the X component XLSET is stored as XL, and the Y component YLSET is stored as YL, the initial flag of the outward route is reset in step S208.

In step 206, when the state is decided not to be flag "1", i.e., the second or further passing, the process proceeds to step S209. In step S209, the decision is made about the state of the interruption switch 54. When the state is decided not to be the interruption state, the process proceeds to step S300. In step S300, the control of the calculation of the outward route (described later) is carried out. In step S500, the control of the calculation of the direction subroutine (described later) is carried out.

When the state is decided to be the interruption state in step S209, no control of the calculation of the outward route subroutine is carried out, and the process proceeds to step S500 of the direction subroutine. In step S216, the remainder distances XL and YL in the X and Y directions between the present position and the destination are calculated on the basis of the digital distance signal d per unit time and the vehicle travel direction $\theta$ and the process proceeds to step S217. IN step S217, the remainder straight distance DL and the direction D$\theta$ toward the destination is calculated. In step S218, the calculated remainder distance and the direction toward the destination are displayed on the fluorescent indicator tube 72.

On the route from the destination to the starting point, the outward/return changeover switch 53 is switched to the return side, hence the decision in step S205 becomes "NO", and the process proceeds to step S210. In step S120, the state of the return route initial flag is decided. If the state is decided as the first passing after the set switch 56 is switched ON, the process proceeds to step S211. In step S211, the X, Y components −XLSET and −YLSET of the distance from the destination to the starting point are stored as XL and YL, respectively. The return route flag is reset in step S212.

If the state is decided as the second time or later passing after the set switch 56 switched ON, the process proceeds to step S213. In step S213, the decision as to whether or not the travel along the return route is completed is carried out. When the decision is YES, the process proceeds to step S215, in which the entire indications on the fluorescent indicator tube 73 are extinguished to indicate the return to the starting point. When the decision at step S213 is NO, the process proceeds to step S400, in which the calculation control of the return route subroutine is carried out. The process then proceeds to step S216.

In step S216, the X, Y directional remainder distances XL and YL are calculated on the basis of the signal d of the digital distance per unit time and the signal $\theta$ of the vehicle travel direction. The process then proceeds to step S217. In step S217, the remainder straight distance DL and the direction D$\theta$ toward the starting point are calculated, and, in step S218, the straight distance and the direction toward the starting point are indicated on the fluorescent indicator tube 72.

Figures 8, 8A:
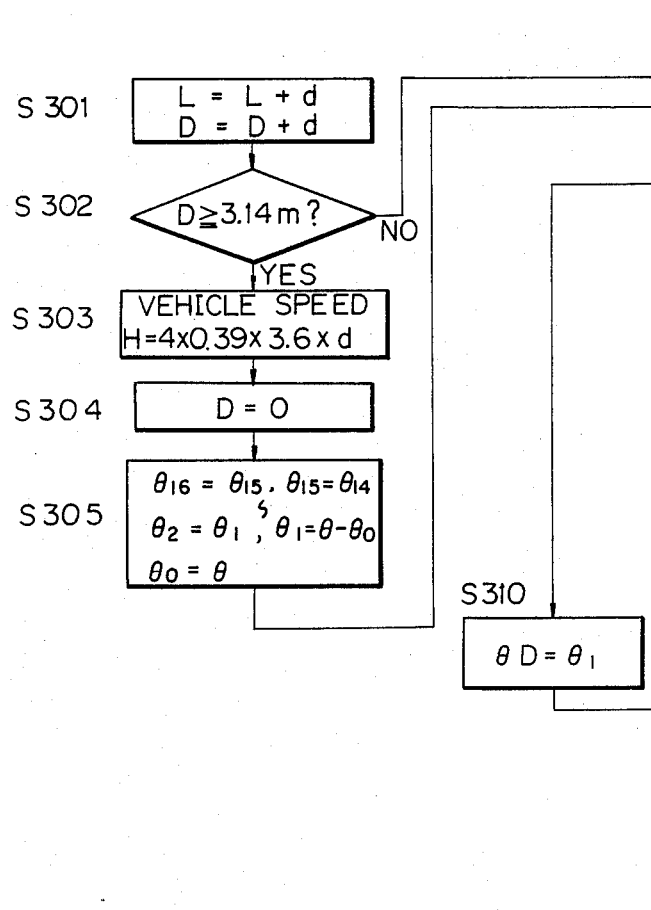
Figure 8B:
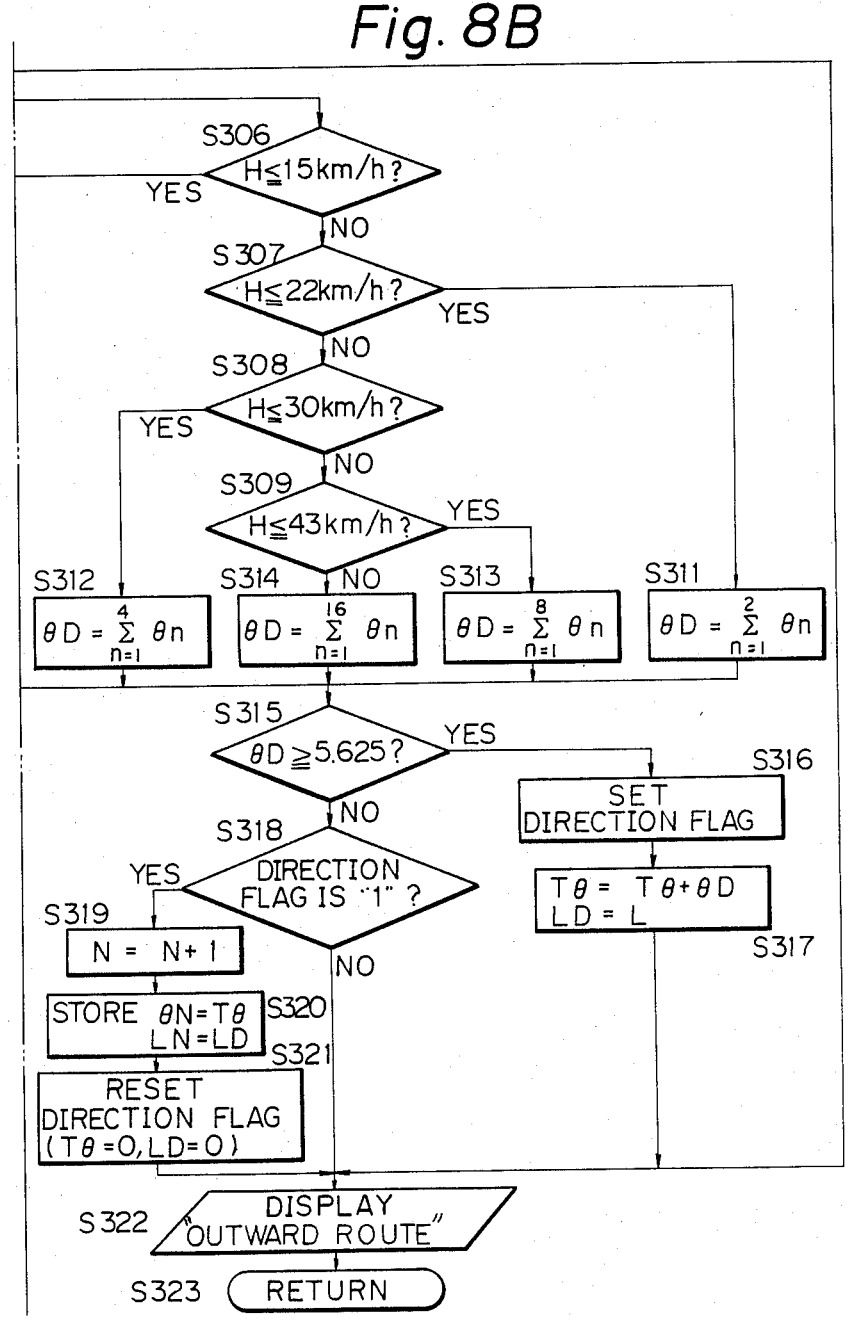

The subroutine S300 illustrated in FIG. 8 is that in which the change of the vehicle travel direction and the travel distance until the change point of the vehicle travel direction on the route from the starting point to the destination are obtained. In step S301, the travel distance L and the unit travel distance D along the route from the starting point to the destination are calculated and stored. The process then proceeds to step S302.

In step S302, the decision as to whether or not the unit travel distance D is equal to or more than 3.14 m is carried out. When the decision is NO, the process proceeds to step S322. In step S322, the "outward travel" indication is indicated on the fluorescent indicator tube 73, and the process returns to step S500 of the interruption routine shown in FIG. 7.

When the decision at step S302 is YES, the process proceeds to step S303 in which the vehicle speed H is calculated and stored. In step S304, the unit travel distance D is made zero. In step S305, the direction change $\theta_1$ per unit travel distance is calculated from the travel direction $\theta$ per 3.14 m of travel and the preceding travel direction $\theta_0$, and the direction changes $\theta_2$ to $\theta_{15}$ of the past fifteen times and the present travel direction $\theta$ is stored as the value $\theta_0$.

In steps S306 to S309, the comparison between the present vehicle speed and four grades of preselected vehicle speeds is carried out. When the vehicle speed is equal to or less than 15 Km/h, the process proceeds to step S310, in which the direction change of the last preceding calculation timing is stored as the value $\theta_D$.

When the vehicle speed is between 15 Km/h and 22 Km/h, the process proceeds to step S311, in which the sum of the direction changes of the last two preceding calculation timings, that is the direction change for the travel distance of 6.24 m, is stored as the value $\theta_D$.

When the vehicle speed is equal to or more than 43 Km/h, the process proceeds to step S314 in which the sum of the direction changes of the last sixteen preceeding calculation timings, that is the direction changes for the travel distance of 50.24 m (=3.14×16 m), is stored as the value $\theta_D$.

In step S315, the decision as to whether or not the value $\theta_D$ is equal to or more than a predetermined value, for example 5.625°, is carried out. When the decision is YES, the process proceeds to step S316 in which the direction flag is set. In step S317, the direction changes $\theta_D$ are integrated and stored as far as the $\theta_D$ is equal to or more than a predetermined value, and the corresponding travel distance L is stored as the value LD.

When the decision at step S315 is NO, the process proceeds to step S318, in which the decision is made as to whether or not the direction flag is set, that is, whether or not the value $\theta_D$ has once been equal to or more than a predetermined value.

When the decision at step S318 is NO, the process proceeds to step S322. When the decision of step S318 is YES, the process proceeds to step S319. In step S319, the count N, which corresponds to the number of direction changes due to crossroads, is increased by one. In step S320, the sum of the direction changes T$\theta$ and the running distance LD corresponding to direction change points are stored as $\theta$N and LN, respectively.

In step S321, the direction flag is reset, and the sum of the direction changes T$\theta$ and the running distance LD are again set to zero. In step S322, the "outward travel" indication is indicated on the fluorescent indicator tube 73, and the process returns to step S500 of the interruption routine shown in FIG. 7.

Figure 9A:
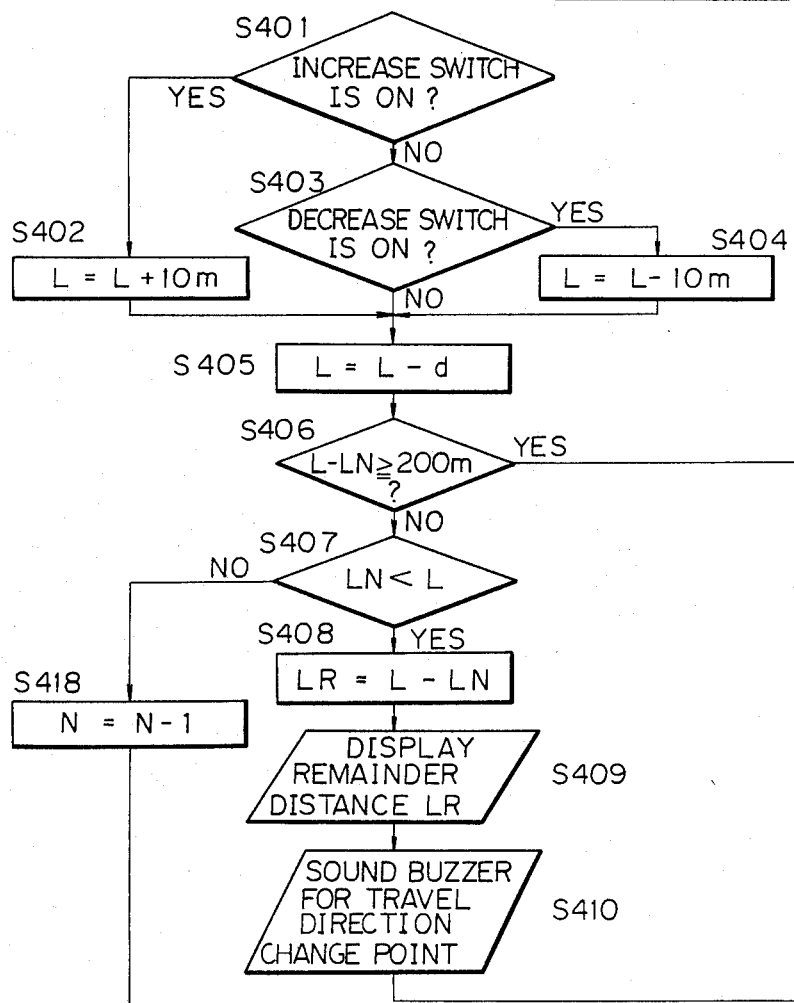
Figure 9B:
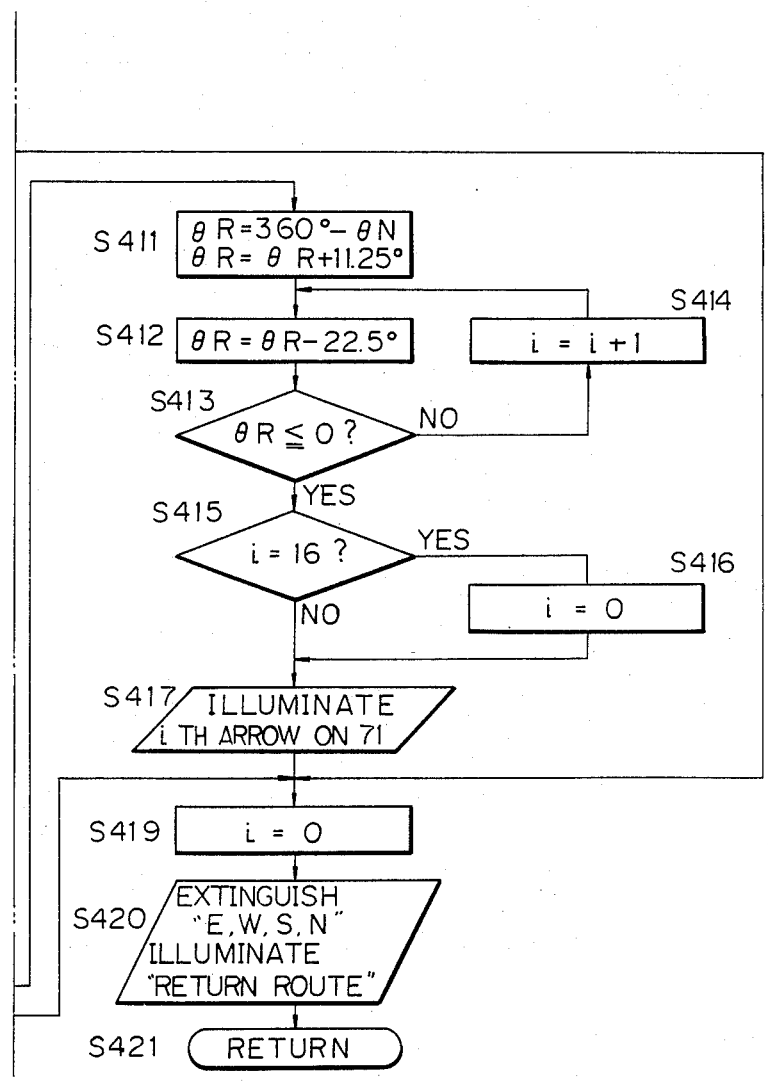

The subroutine S400 for the indications of the vehicle travel direction and the remainder distance toward the direction change point in the return route is illustrated in the flow chart shown in FIG. 9. In steps S401 and S402, the decision is made as to whether or not the distance increase switch or the distance decrease switch is in an ON state. When it is decided that the distance increase switch is in an ON state, the process proceeds to step S402, in which the distance L from the outward route is added by 10 m. When it is decided that the distance decrease switch is in an ON state, the process proceeds to step S404 in which the distance L from the outward route is decreased by 10 m.

In step S405, the travel distance L is decreased by the running distance d per unit of time. In step S406, the decision is made as to whether or not the travel distance LN toward the Nth direction change point which is stored based on the difference between L and the travel distance LN toward the Nth direction change point stored on the outward route is equal to or more than 200 m. When the decision is YES, the process proceeds to step S419; if the decision is NO, the process proceeds to step S407.

In step S407, the decision is made as to whether or not L is greater than LN. When the decision is NO, i.e., the vehicle has passed the Nth direction change point, the process proceeds to step S418.

In step S418, N is decreased by one, and the process proceeds to step S419. When the decision at step S407 is YES, the process proceeds to step S408, and the remainder distance LR toward the direction change point is calculated. In step S409, the indications "remainder", "m", and LR are indicated on the fluorescent indicator tube 73.

In step S410, the buzzer is sounded to indicate that the distance toward the direction change point is equal to or less than 200 m. In steps 411 to 416, the direction in question is selected from the sixteen directions of travel on the return route, on the basis of the Nth direction change $\theta$N which is stored on the outward route. In step S417, the arrow indication 71i in question is illuminated on the fluorescent indicator tube 71.

For example, when the direction change $\theta$N is equal to 120°, the $\theta$R is calculated to be 251.25° in step S411. Then, in steps S412 to S415, the i is calculated to be 11 (because 251.25°÷22.5=11.17), and hence, the arrow indication 7111 is illuminated on the fluorescent indicator tube 71.

In step S419, i is made zero. In step S420, the indication of east, west, south, and north on the fluorescent indicator tube 71 is extinguished, and the indication "return route" is illuminated on the fluorescent indicator tube 73. The process then proceeds to step S216 in the interruption routine shown in the flow chart of FIG. 7.

Figure 10:
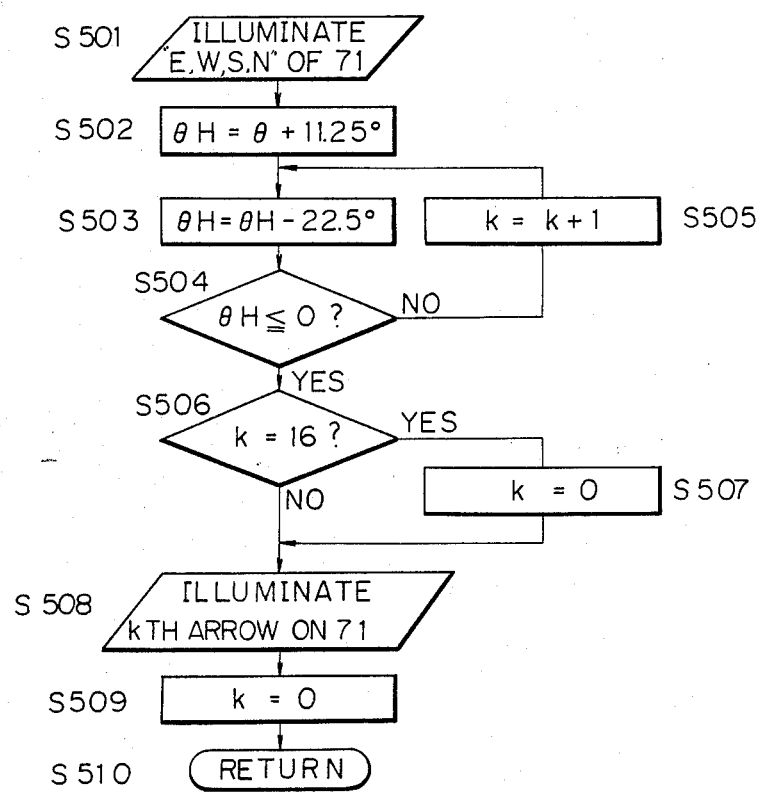

The subroutine S500 for calculating and displaying the present vehicle travel direction is shown in the flow chart of FIG. 10. In step S501, the indication of east, west, south, and north on the fluorescent indicator tube 71 is illuminated. In steps S502 to S507, the selection from the sixteen vehicle travel direction indications other than east, west, south, and north is carried out on the basis of the vehicle travel direction $\theta$. In step S508, an arrow indication 71K is illuminated on the fluorescent indicator tube 71.

For example, when the vehicle travel direction $\theta$ is equal to 48.5°, the value $\theta$H is calculated to be 59.75° in step S502. In steps S503 to S507, K is calculated to be equal to 2 (because 59.75°÷22.5°=2.66) and, hence, the arrow indication 702 is illuminated on the fluorescent indicator tube 71. In step S509, K is made zero, and the process proceeds to step S216 of the interruption routine shown in the flow chart of FIG. 7.

The reason for the variations in the distance of the detection of vehicle travel direction change in accordance with the vehicle speed in the outward route subroutine shown in the flow chart of FIG. 8 will now be explained. It is well known that a vehicle cannot make a turn at a transversal acceleration greater than a predetermined value. In a device according to the present invention, in which the change of the vehicle travel direction is to be automatically detected, it is not necessary to detect an easy curve in the road; it is only necessary to detect a curve corresponding to the transversal acceleration greater than a predetermined value of, for example, 0.03G.

Thus, in the device according to the present invention, only the curves corresponding to the transversal acceleration greater than a predetermined value are detected, by varying the distance of the detection of the vehicle travel direction in accordance with the vehicle speed.

For example, when the vehicle speed is 20 km/h, the distance of the detection of the vehicle travel direction is equal to 6.28 m (=3.14×2 m), and the transversal acceleration and the radius of rotation are given as follows.

$$G = V^2/(r \times 9.8) \quad (1)$$

$$r = l/\theta \quad (2)$$

where the vehicle speed is v[m/s], the radius of rotation is r m, the travel distance per unit of time is l[m/s], and the rotation angle per unit of time is $\theta$[radian/s].

By substituting equation (1) with equation (2), and assuming that l=6.28 m and $\theta$=5.625°/57.3°, the transversal acceleration G is calculated to be equal to 0.049.

Although a preferred embodiment of the present invention has been described hereinbefore, various modifications and alternations are possible without departing from the scope of the present invention. For example, a hardware logic electronic circuit can be used as the calculation means, instead of the above-described microcomputer. A gyrocompass or others can be used as the direction detection means, instead of the above-described terrestrial magnetism detection unit. Another type of flux gate sensor, a Hall effect element, or others can be used as the direction sensor, instead of the above-described ring core type flux gate sensor. Another type of the direction detection unit in which the vehicle travel direction is detected from the difference between the rotational speeds of left and right wheels or of left and right front wheels can be used. Also, another type of the direction detection unit in which the vehicle travel direction is detected from the direction of rotation of the steering wheel can be used.

Further, instead of the above-described angle value setting method by the direction set switch 52, a method can be provided of supplying the calculation means with the coded data representing terrestrial magnetism directions such as "north-east", "south-south-west", and the like.

What is claimed:

1. A device for displaying information concerning a travel route of an automotive vehicle comprising:
   direction detection means for generating a direction signal corresponding to a vehicle travel direction;
   distance detection means for generating a distance signal corresponding to a distance travelled by the vehicle;
   control means for: (1) continuously monitoring changes in the travel direction of the vehicle on the basis of the direction signal detected by said direction detection means with reference to a reference compass bearing, (2) successively storing: (a) direction change indication signals corresponding to an amount of change in the direction of travel of the vehicle with reference to said reference compass bearing when an amount of change in the travel direction of the vehicle exceeds a predetermined amount, and (b) distance signals, each of which corresponds to a distance from a distance reference, at a time of storing one of said direction change indication signals on the route from the starting point to the destination, and (3) generating a travel direction signal indicative of a travel direction substantially at every predetermined distance interval on the route from the destination to the starting point on the basis of said stored direction change indication signals and said stored distance signals, displaying means for displaying the travel direction on the route from the destination to the starting point on the basis of said travel direction signal delivered from said control means; and instruction means for supplying said control means with a mode signal for determining a mode of control thereof corresponding to one of the outward travel state and the return travel state.

2. A device according to claim 1, wherein the change in the vehicle travel direction is detected when the amount of change in the vehicle travel direction exceeds a predetermined amount per predetermined distance, and said monitoring of the change in the vehicle travel direction by said control means is carried out in such a manner that the distance interval at which the change of the vehicle travel direction is detected is changed in accordance with the vehicle running speed.

3. A device according to claim 1, wherein said direction detection means comprises a direction sensor, and a direction detection assembly coupled to said direction sensor, having series connections of a filter circuit, an amplification sample and hold circuit, analog-to-digital converter means for producing digital directional signals, and oscillation timing means for producing a signal for exciting the direction sensor and timing signals.

4. A device according to claim 1, wherein said control means comprises:
   a central processor unit;
   a plurality of instruction switches;
   a decoder means for receiving signals from said central processor unit and producing read signals; and
   three state buffer means for receiving signals representing a state of said instruction switches and read signals from said decoder means and transmitting the received signals to a bus line connected to said central processor unit and said three state buffer means.

* * * * *